(12) United States Patent
Dahule

(10) Patent No.: US 9,850,152 B2
(45) Date of Patent: Dec. 26, 2017

(54) SYSTEM AND A PROCESS FOR WATER DESCALING

(71) Applicant: Rahul Kashinathrao Dahule, Maharashtra (IN)

(72) Inventor: Rahul Kashinathrao Dahule, Maharashtra (IN)

( * ) Notice: Subject to any disclaimer, the term of this patent is extended or adjusted under 35 U.S.C. 154(b) by 0 days.

(21) Appl. No.: 14/773,617

(22) PCT Filed: Mar. 14, 2014

(86) PCT No.: PCT/IN2014/000167
§ 371 (c)(1),
(2) Date: Sep. 8, 2015

(87) PCT Pub. No.: WO2014/147645
PCT Pub. Date: Sep. 25, 2014

(65) Prior Publication Data
US 2016/0016834 A1    Jan. 21, 2016

(30) Foreign Application Priority Data

Mar. 15, 2013  (IN) ............................ 801/MUM/2013

(51) Int. Cl.
| | | |
|---|---|---|
| *C02F 1/30* | (2006.01) | |
| *C02F 5/02* | (2006.01) | |
| *C02F 1/34* | (2006.01) | |
| *C02F 1/32* | (2006.01) | |
| *C02F 103/00* | (2006.01) | |
| *C02F 103/02* | (2006.01) | |
| *C02F 103/06* | (2006.01) | |

(52) U.S. Cl.
CPC .................. *C02F 5/02* (2013.01); *C02F 1/30* (2013.01); *C02F 1/34* (2013.01); *C02F 1/32* (2013.01); *C02F 2103/002* (2013.01); *C02F 2103/023* (2013.01); *C02F 2103/06* (2013.01); *C02F 2303/22* (2013.01)

(58) Field of Classification Search
CPC ...... A61L 2/08; C02F 1/30; C02F 1/32; C02F 9/00; Y02W 10/37
See application file for complete search history.

(56) References Cited

U.S. PATENT DOCUMENTS

| | | | |
|---|---|---|---|
| 4,940,538 A | 7/1990 | Danfoss | |
| 5,494,585 A | 2/1996 | Cox | |
| 6,299,844 B1 * | 10/2001 | Tao | ........................ B01J 19/123 210/748.11 |

(Continued)

FOREIGN PATENT DOCUMENTS

| | | |
|---|---|---|
| WO | 20064818 A1 | 11/2000 |
| WO | 2012041766 A1 | 4/2012 |

*Primary Examiner* — Walter D. Griffin
*Assistant Examiner* — Cameron J Allen
(74) *Attorney, Agent, or Firm* — David Guerra

(57) ABSTRACT

The present invention relates to an apparatus for water descaling. The system comprises hydrodynamic cavitation reactors with a cavitator selected from the group consisting of an orifice plate, venturi and a rotating cavitator, in combination with an infrared radiation emitter. Combination of hydrodynamic cavitation reactor with infrared radiation achieves effective salt precipitation from the hard water with reduced pressure drop and reduced number of recirculation, resulting in higher savings due to reduced energy costs.

18 Claims, 7 Drawing Sheets

(56) References Cited

U.S. PATENT DOCUMENTS

| | | | | |
|---|---|---|---|---|
| 6,555,011 | B1* | 4/2003 | Tribelsky | A61L 2/08 |
| | | | | 204/158.2 |
| 6,812,470 | B2* | 11/2004 | Sato | C02F 1/325 |
| | | | | 210/748.04 |
| 7,815,810 | B2 | 10/2010 | Pandit et al. | |
| 2004/0188352 | A1* | 9/2004 | Dey | B01D 61/022 |
| | | | | 210/652 |
| 2005/0042129 | A1* | 2/2005 | Kazem | B01F 13/0001 |
| | | | | 422/20 |
| 2006/0081541 | A1* | 4/2006 | Kozyuk | C02F 1/72 |
| | | | | 210/748.15 |
| 2006/0169649 | A1* | 8/2006 | Hsueh | B08B 9/0321 |
| | | | | 210/764 |
| 2007/0102371 | A1* | 5/2007 | Bhalchandra | B63J 4/004 |
| | | | | 210/748.01 |
| 2009/0050572 | A1* | 2/2009 | McGuire | C02F 1/004 |
| | | | | 210/638 |

\* cited by examiner

SYSTEM AND A PROCESS FOR WATER DESCALING

FIELD OF THE INVENTION

The present invention relates to an apparatus for water descaling.

More particularly, the present invention relates to an apparatus coupled with an infrared radiation emitter means for water descaling.

BACKGROUND

In most of the chemical treatment plants, cooling water systems such as heat exchangers, piping and cooling tower forms an integral part of the control process operations. For any control process, the heat transfer performance of the cooling tower must be maintained. Water in cooling towers needs to be treated to control microbial growth, scale formation, and metal corrosion of the process equipment surfaces. Scaling is the formation of crystalline deposits of water soluble salts such as calcium carbonate, magnesium hydroxide and calcium sulphate on piping, heat exchangers and other process equipment surfaces. Scaling occurs when the highly soluble and naturally occurring calcium bicarbonate decomposes into calcium carbonate and $CO_2$ gas. Unlike calcium bicarbonate, calcium carbonate has a very low solubility in water, approximately 15 mg/L, and unlike most compounds it tends to precipitate out of solution with increasing temperature. At the air-water interface of a cooling water system, a portion of water evaporates leaving dissolved solids behind and increasing the remaining concentration of total dissolved solids (TDS) such as calcium carbonate. The scale acts as an insulator and thereby reduces cooling tower efficiency resulting in an increased backpressure, higher pumping requirements, and increased energy use. In heat exchangers such as plate heat exchangers a thin layer of scale can reduce heat exchange efficiency by as much as 0.15%. Scale build-up also causes bio-fouling in a reactor. Bio-fouling has been recognized as an important contributor to impaired heat transfer causing decrease in thermal efficiency and increased power consumption. Preventing scale build-up is one of the primary objectives of a traditional cooling tower chemical treatment program.

Cavitation method is often employed at the cooling tower water circuit to take care of bio-fouling and water scaling. Cavitation is the formation, growth, and implosion of vapour bubbles in a liquid. It can be created by sound waves (ultrasonic or acoustic cavitation), lasers, or by fluctuations in fluid pressure (hydrodynamic cavitation). Cavitation method can be used to facilitate the precipitation and removal of calcium carbonate in the water. The following equation describes the reaction followed in the cavitation method.

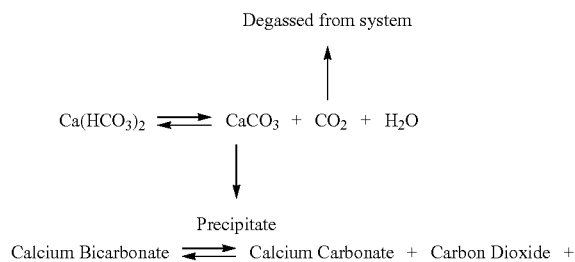

The soluble calcium bicarbonate salts in water form solid calcium carbonate and carbon dioxide gas, and as the carbon dioxide gas is removed, the equilibrium is shifted to the right side of the equation. Carbon dioxide is degassed from water and the solid precipitate is easily removed from water through the use of a cyclonic separator or a filtration system. Because both calcium bicarbonate and calcium carbonate are simultaneously removed from the water stream, the solubility limit of calcium carbonate is not reached and scaling is inhibited. Thus, in hydrodynamic cavitation (HC) chamber, water undergoes cavitation and calcium bicarbonate $(CaHCO_3)_2$ from water is precipitated out in the form of calcite $(CaCO_3)$. In the chamber, the chemical equilibrium of the carbonate species in water is shifted, driving the reaction equilibrium to the right, precipitating out calcium bicarbonate. The calcium carbonate crystals steadily grow and are easily removed from the water stream using a filtration system.

Hydrodynamic cavitation provides increased nucleation sites in the form of small sized $CaCO_3$ colloids. These colloids then act as growth sites for other dissolved ions. As continued crystal growth is thermodynamically favoured over the formation of new nuclei, the calcite crystals continue to grow in size. Coagulation increases due to greater mass attraction, and the filtration system then removes the larger particles that precipitate out.

Hydrodynamic cavitation involves the process of vaporisation, bubble generation and bubble implosion which occurs in a flowing liquid as a result of a decrease and subsequent increase in pressure. Cavitation will only occur if the pressure declines to some point below the saturated vapor pressure of the liquid and subsequent recovery above the vapor pressure. If the recovery pressure is not above the vapor pressure then flashing is said to have occurred. In pipe systems, cavitation typically occurs either as the result of an increase in the kinetic energy (through an area constriction) or an increase in the pipe elevation.

Hydrodynamic cavitation can be produced by passing a liquid through a constricted channel at a specific velocity or by mechanical rotation of an object through a liquid. In the case of the constricted channel and based on the specific (or unique) geometry of the system, the combination of pressure and kinetic energy can create the hydrodynamic cavitation cavern downstream of the local constriction generating high energy cavitation bubbles.

Hydrodynamic, cavitation systems for water descaling are known in art. Some prior art suggests treating water or fluids using Hydrodynamic cavitation reactors coupled to ultraviolet radiation for improving the efficiency of water treatment process.

U.S. Pat. No. 4,990,260 describes a device for purifying water comprising two separate steps. In the first step, the polluted water is transported through a venturi, arranged in a reactor chamber, such that cavitation is caused. In the second step the oxidizable contaminants are oxidized by UV light in a separate reactor chamber.

US20100090124 discloses a method and apparatus for disinfecting fluids. The method generally includes cavitating and irradiating a fluid by exposing the fluid to an ultraviolet radiation. The patent discloses combining rotating cavitator and UV lamps in a single reactor for improving the transmittance of the circulating fluid. However the patent does not discloses or suggests the process of water descaling.

US20130248429 discloses a method for purifying water in a reactor containing hydrodynamic cavitation coupled to a pulsed/continuous UV radiation. However the patent does not focuses on the process of water descaling.

Hydrodynamic cavitation systems known in the art are quite expensive on the operating cost. An extent of pressure drop across the restriction device translates to the energy cost. It is observed that HC rector with moderate pressure drop in the re-circulatory mode of operation yields prolonged cavitation exposure which improves salt removal efficiency. The same volume of water is subjected to hydrodynamic cavitation over a prolonged time through the desired number of recirculations which increases the energy cost.

Thus it is desirable to provide an apparatus for water descaling which provides effective salt precipitation in a single pass of water circulation and thereby reduce number of water recirculation loops, resulting in reduced energy costs.

Objects of the Invention

It is an object of the present invention is to provide, an apparatus for water descaling which provides effective salt precipitation of the soluble salts from water.

Another object of the present invention is to provide an apparatus which serves the dual purpose of water descaling and removal of bio-fouling from water.

Still another object of the present invention is to provide an apparatus for water descaling which helps to reduce the number of water recirculation loops and thereby reducing the energy costs.

Still another object of the present invention is to provide an apparatus for water descaling which may be deployed in a medium similar to mediums such as water, grey water, sea water, radioactively-toxic water or any other such medium requiring dissolved salt to be removed by precipitation.

Yet another object of the present invention is to provide an apparatus for water descaling which may be used for selective $CO_2$ de-gassing from water related medium where $CO_2$ is in the dissolved state.

SUMMARY

In accordance with the present invention there is provided an apparatus for water descaling, said apparatus comprising:
a. at least one inlet for introducing hard water stream containing soluble salts in the apparatus;
b. a hydrodynamic cavitation reactor communicating with said at least one inlet, said cavitation reactor comprising a cavitator;
c. at least one infrared radiation emitter, said emitter placed in a location selected from the group consisting of, inside the cavitation reactor and outside the cavitation reactor; and
d. a filter assembly fitted downstream of the emitter.

Typically, the cavitator is at least one selected from the group consisting of an orifice plate, venturi and a rotating cavitator.

Typically, the cavitator is at least one venturi configured within the cavitation reactor.

Typically, the cavitator is at least one orifice plate.

Typically, the orifice plate is a multihole orifice plate.

Typically, the cavitator is a combination of at least one venturi configured within the cavitation reactor and at least one multihole orifice plate arranged in series with the configured venturi.

Typically, the emitter is placed inside the cavitation reactor on the cavitating side of the cavitator.

Typically, the emitter is placed outside the cavitation reactor in a chamber arranged downstream to the cavitation reactor.

Typically, the emitter is a medium pressure ultraviolet lamp emitting ultra violet and infrared radiations.

Typically, the emitter is at least one selected from the group consisting of a spiral array of IR light emitting diodes (LEDs), radial array of IR LED s and axial array of IR LEDs.

Typically, the array of IR LED s is arranged on the cavitating side of the multihole orifice plate.

Typically, the emitter is placed between consecutive multihole orifice plates.

Typically, the IR LED s are of multiple mono wavelengths, each specific to maximum $CO_2$ absorption and maximum water absorption.

Typically, the cavitation reactor has at least one reflector coating to reflect infrared radiation from the emitter.

Typically, the reflector coating is a vacuum deposition of a metal selected from the group consisting of gold, aluminium and silver.

Typically, the cavitation reactor further comprises at least one gas or steam inlet, for injecting air or gas or steam bubbles in the cavitation reactor for varying the intensity of cavitation.

Typically, wherein the apparatus further includes a degassifier placed between emitter and the filter assembly.

BRIEF DESCRIPTION OF THE ACCOMPANYING DRAWINGS

The invention will now be described with the help of the accompanying drawings.

DETAILED DESCRIPTION

Figure 1:
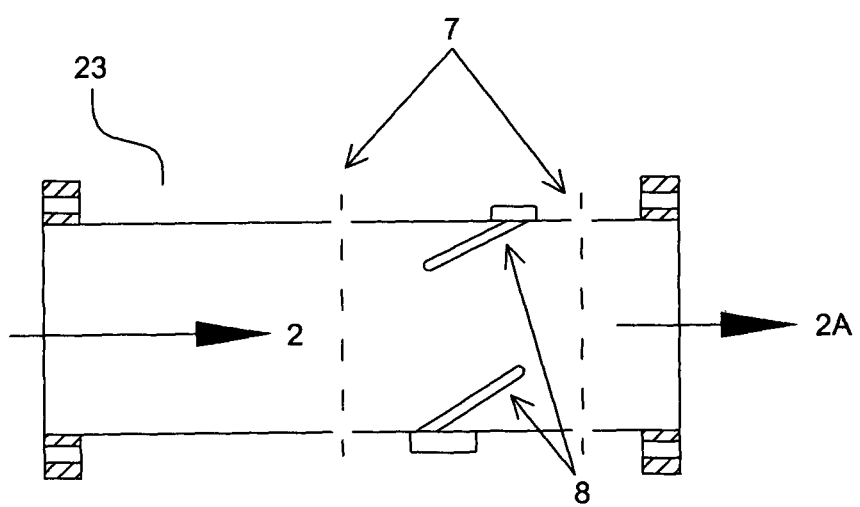
FIG. 1 illustrates a schematic cross sectional view of a first embodiment of the hydrodynamic cavitation reactor arranged with infrared radiation in accordance with the present invention.
Figure 2:
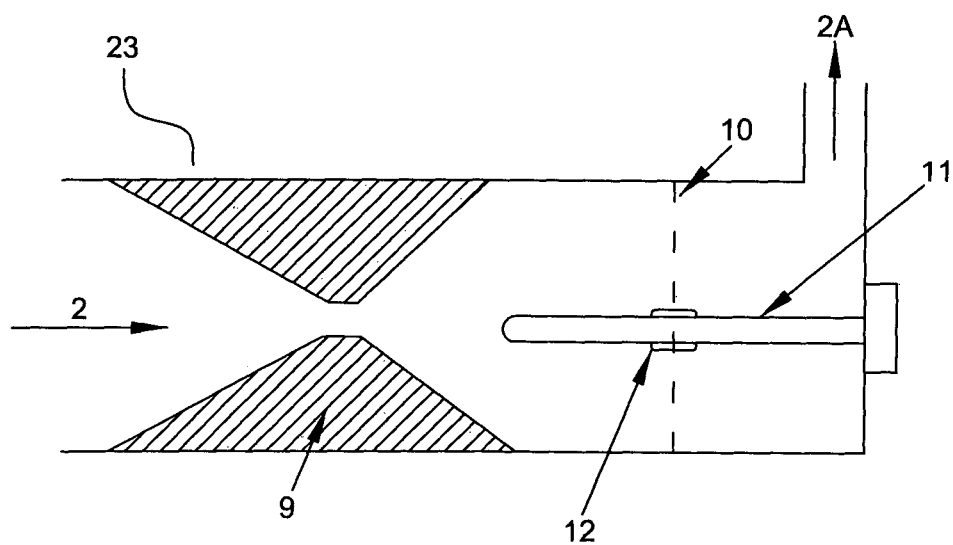
FIG. 2 illustrates a schematic cross sectional view of a second embodiment of the hydrodynamic cavitation reactor arranged with infrared radiation in accordance with the present invention.
Figure 3:
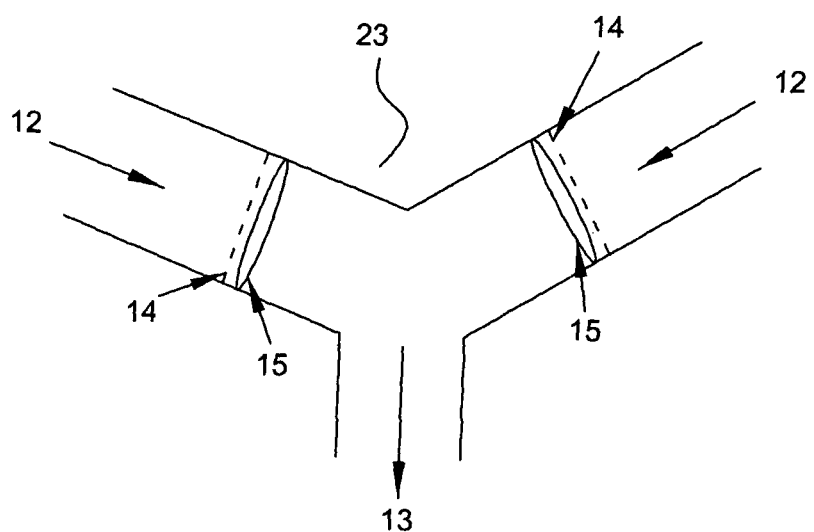
FIG. 3 illustrates a schematic cross sectional view of a third hydrodynamic cavitation reactor arranged with infrared radiation in accordance with the present invention.
Figure 4:
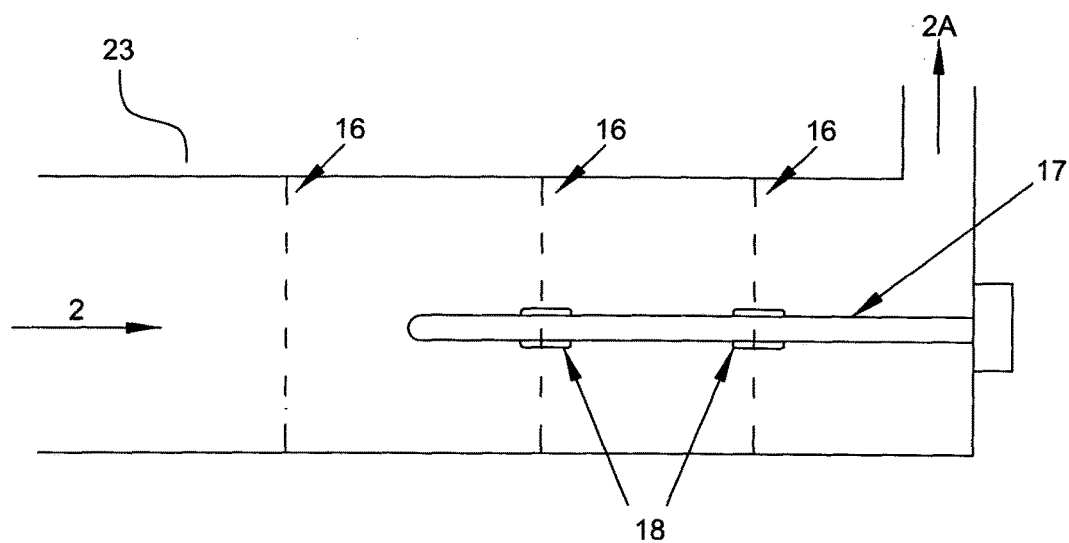
FIG. 4 illustrates a schematic cross sectional view of a fourth hydrodynamic cavitation reactor arranged with infrared radiation in accordance with the present invention.
Figure 5:
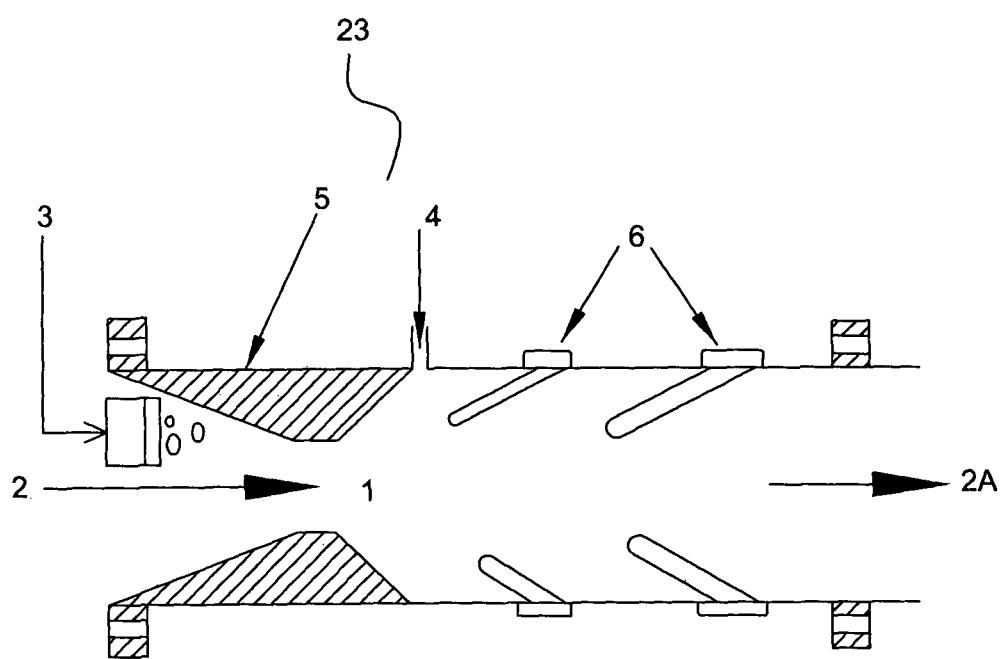
FIG. 5 illustrates a schematic cross sectional view of a fifth hydrodynamic cavitation reactor arranged with infrared radiation in accordance with the present invention.
Figure 6:
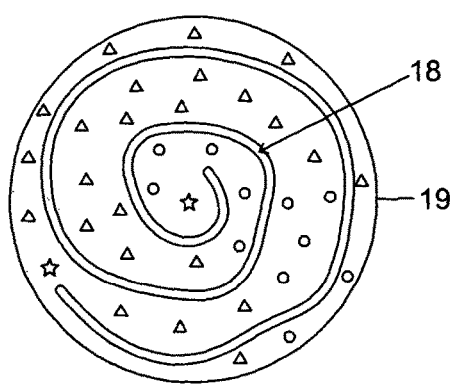
FIG. 6 illustrates a side view of a variant of an orifice plate arranged with infrared radiation in accordance with the present invention.
Figure 7:
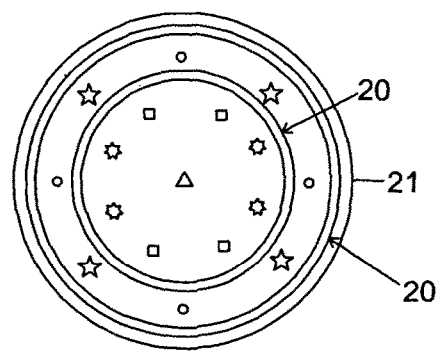
FIG. 7 illustrates a second variant of an orifice plate arranged with infrared radiation in accordance with the present invention.
Figure 8:
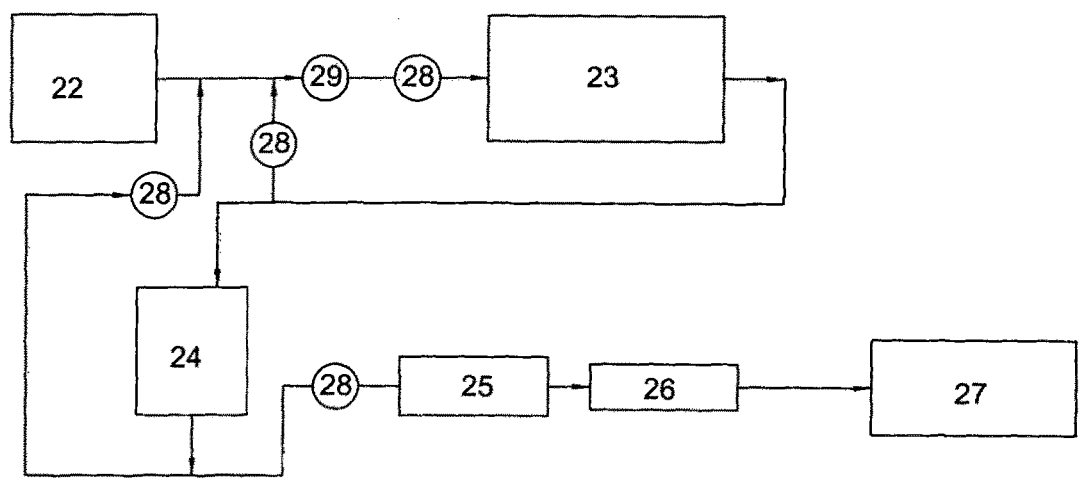
FIG. 8 illustrates a schematic block diagram of the apparatus arranged with infrared radiation in a chamber in accordance with the present invention.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The description herein after, of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The present invention provides an apparatus for water descaling. The apparatus consists of a hydrodynamic cavitation reactor coupled with an infrared radiation emitter.

Hard water contains calcium bicarbonate and often magnesium bicarbonate and/or similar ions. Calcium salts, such as calcium bicarbonate and calcium carbonate are more soluble in hot water than cold water. Thus, heating water does not cause calcium carbonate to precipitate per se. However, there is equilibrium between dissolved calcium bicarbonate and dissolved calcium carbonate, $$Ca^{2+} + 2HCO_3^- \leftrightarrows Ca^{2+} + CO_3^{2-} + CO_2 + H_2O.$$

The equilibrium is driven by the carbonate/bicarbonate, not the calcium. $CO_2$ is also soluble in water, there is also an equilibrium of carbon dioxide dissolved in water (dissolved) and the gaseous state (g): $CO_{2(dis)} \leftrightarrows CO_{2(g)}$ The equilibrium of $CO_2$ moves to the right towards gaseous $CO_2$ when water temperature rises. Thus, when water is warmed, $CO_2$ is removed from water causing the equilibrium of bicarbonate and carbonate to shift to the right, increasing the concentration of dissolved carbonate. As the concentration of carbonate increases, calcium carbonate precipitates as the salt, $Ca^{2+} + CO_3^{2-} \leftrightarrows CaCO_3$.

As new cold water with dissolved calcium carbonate/bicarbonate is added and heated, $CO_2$ gas is removed, carbonate concentration increases, and more calcium carbonate precipitates. Calcium carbonate precipitation is a reversible reaction where the equilibrium can be shifted to precipitation by decreasing pressure, increasing temperature, accelerating the release rate of $CO_2$ and diluting feed with inerts/solvents. Release rate of carbon dioxide is critical to effective precipitation. Calcium carbonate precipitation also depends on pH and concentration of $HCO_3^-$, $CO_3^{--}$, $Ca^{++}$, $Mg^{++}$ ions in the water stream.

Hydrodynamic Cavitation (HC) is often employed at the cooling tower water circuit to take care of bio-fouling and water descaling of the hard water. At air-water interface, a portion of water evaporates as water vapour, absorbing energy, and thus causing the remaining water to cool. The evaporated water leaves dissolved solids behind, increasing the remaining concentration of total dissolved solids (TDS), including calcium carbonate. Each time, water is recirculated the TDS concentration increases. Eventually, water becomes saturated with calcium carbonate, resulting in precipitation and scale formation on heat transfer surfaces. By facilitating the precipitation of calcium carbonate though the use of hydrodynamic cavitation, calcium carbonate is continuously removed from the circulating cooling tower water. The following equation describes the reaction that occurs within the chamber.

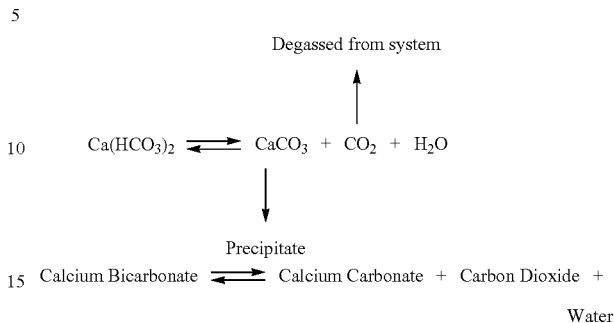

The chemical equilibrium of the carbonate species is shifted, driving the above reaction to the right. As a result, the soluble calcium bicarbonate converts into a solid calcium carbonate precipitate and carbon dioxide gas. As long as CO2 is removed, the equilibrium tends to stay to the right side of the equation. The solid precipitate is easily removed from water through the use of a cyclonic separator or filtration system. Carbon dioxide is degassed from water upon leaving the hydrodynamic cavitation unit and entering the cooling tower basin. Because both calcium bicarbonate and calcium carbonate are simultaneously removed from water stream, the solubility limit of calcium carbonate is not reached and scaling is inhibited. Thus, when water undergoes cavitation in the HC chamber, the calcium bicarbonate $(CaHCO_3)_2$ in water is forced to precipitate out in the form of calcite $(CaCO_3)$.

Hydrodynamic cavitation is the result of a substantial pressure reduction in the liquid at a constant temperature. If the pressure is reduced and maintained long enough below a certain critical pressure, determined by the physical properties and conditions of the liquid, cavitation will result. As a result of cavitation, vacuum, vapour and gas bubbles are created in the liquid. These bubbles cause the formation of voids. Millions of cavities grow and collapse simultaneously at different locations. When these bubbles implode tiny pockets of high temperatures and pressures are created. Collapse and oscillation of the cavities creates high magnitude pressure pulses of about 100 to 1000 bars and intense localized microsecond duration hot spots of more than 10,000° C.

Hydrodynamic cavitation is accomplished with following restriction devices a. Rotating cavitator, b. venturi, c. orifice plate It is known from the published literature that the energy consumption in case of rotating cavitator is much higher and flexibility of the design parameters is low compared to hydrodynamic cavitation reactors based on the use of orifice plates or venturi.

Orifices and venturi are reported to be widely used for generating hydrodynamic cavitation. A venturi has an inherent advantage over an orifice because of its smooth converging and diverging sections, such that that it can generate a higher velocity at the throat for a given pressure drop across it. On the other hand, an orifice has an advantage that it can accommodate more number of holes (larger perimeter of holes) in a given cross sectional area of the pipe.

Cavitation intensity is directly proportional to the order of magnitude of bubbles pressure and temperatures released upon the collapse of the bubble (transient cavitation) along with the magnitude of the shear stresses (as a result of fluctuating velocities, stable cavitation) produced by the bubbles. Cavitation number Cv, a dimensionless number $((P2-Pv)/\frac{1}{2}\ rho\ u^2))$ gives an indication of cavitation intensity, where, P2=discharge pressure downstream the restriction, Pv=vapour pressure, rho=density of water, u=velocity of water at the constriction. Cavitation number is an important operating parameter to measure intensity of cavitation. Cavitation number is a simple and fast tool to quantify the extent of cavitation When cavitation number is greater than one, it means that the liquid is resistant to the cavitation.

When cavitation number is less than one, it means that fluid energy (velocity head and pressure head at constriction) is being taken for the creation of vapor phase and hence cavitation.

Lower the cavitation number, higher is the quantity of energy taken for the cavitation process and more is its intensity. Impurities present in the liquid aid the process of formation of vapor phase, thus every time it is not essential to lower the pressure over the liquid for cavitation to occur. Hence cavitation also occurs when cavitation number is greater than one (cavitation number>1).

Venturi and orifice based hydrodynamic cavitator have different bubble dynamics that are characterised by Cv.

| Venturi | Multihole Orifice |
| --- | --- |
| Stable cavitation >> Transient Cavitation | Transient Cavitation >> Stable Cavitation |
| Big bubbles | Smaller bubbles |
| More cavitation events | Lesser cavitation events |
| Larger time scales for bubble growth | smaller time scales for bubble growth |
| Efficient Pressure Recovery | Abrupt Pressure Recovery. Pressure Recovery can be improved by increasing number of holes |
| Mostly mechanical effects | Mechanical + Chemical effects (OH radicals) |
| Relatively lower design flexibility compared to that of Multihole | Higher design flexibility |

Infrared (IR) light is electromagnetic radiation with longer wavelengths than those of visible light, extending from the nominal red edge of the visible spectrum at 0.74 micrometers (μm) to 0.3 mm. IR has higher heat transfer capacity. Water absorbs IR. Water contains dissolved gases, the solubility of gas obeys Henry's law, that is, the amount of a dissolved gas in a liquid is proportional to its partial pressure. Therefore, placing a solution under reduced pressure makes the dissolved gas less soluble.

IR has higher absorption towards water and also has selective absorbance towards dissolved $CO_2$ over dissolved $O_2$ and $N_2$ in the water. IR LEDs emit a mono wavelength which offers flexibility to choose a wavelength that gives the highest absorbance towards $CO_2$ and/or the highest absorbance towards water.

The present invention provides a combination of hydrodynamic cavitation reactor and an Infrared radiation emitter for descaling hard water. The apparatus consists of a hydrodynamic cavitation reactor containing a cavitator, at least one infrared radiation emitter and a filter assembly.

In accordance with the present invention, the cavitator is at least one selected from the group consisting of an orifice plate, a venturi configured within the cavitation reactor and a rotating cavitator.

In one embodiment of the present invention the cavitator is a combination of at least one venturi configured within the cavitation reactor and at least one orifice plates arranged in series with the configured venturi. Preferably, the orifice plate is a multihole orifice plate where each hole may be of different shape to produce different intensity of cavitation.

In accordance with the present invention, the infrared radiation emitter is selected from the group consisting of a spiral array of IR light emitting diodes (LEDs), radial array of IR LED s and axial array of IR LEDs. IR LEDs of multiple mono wavelengths, each specific to maximum $CO_2$ absorption and maximum water absorption can be selected and mixed in an IR LED array. IR emitters are at least partially submerged in the water medium. The electric parts of IR emitter such as electrode end(s), LED circuit(s) will be configured in waterproof arrangements in case there is a direct contact of such parts with the water to be treated. Alternatively partially submerged configuration of single ended IR emitter may be considered for their placement to the downstream of the cavitating restriction. In this alternative configuration, electric parts of IR means will be placed outside the descaling reactor. The IR dose is the product of IR intensity (expressed as energy per unit surface area) and residence time and is an important parameter to characterize the extent of IR radiation. IR dose will be monitored as an important design and operating parameter.

IR source may be operated to emit radiation in continuous and/or pulsed mode. If deployed in pulsed mode, IR radiation can be effectively synched in with the cavitation frequency, to maximize/optimize descaling objective. Number of pulsed IR emitter can be arranged in such a way that they are pulsing at non-overlapping time intervals so that the collapsing bubble cavities can be effectively targeted across the given cross-section of the reactor to maximize the physicochemical effects upon the collapse of the bubbles.

In a preferred embodiment of the present invention IR emitters are positioned downstream of the cavitator. Position varies for the cluster of air bubbles, for the cluster of steam-induced bubbles, for the cluster where $CO_2$ is readily released from the equilibrium reaction affected by the cavitator. The IR emitter may be preferably arranged adjacent the orifice plate on the cavitation side. The IR emitter may be arranged outside of the plurality of holes, in such a way that the means do not block the holes. The means could be arranged at the outer boundary of the orifice plate, or in between the plurality of holes. Alternatively the IR emitter could also be individually arranged for each of the individual hole on the orifice plate.

In another embodiment of the present invention the emitter is a medium pressure UV lamp having a polychromatic spectral distribution ranging from 190 nm extending up to 0.3 mm. Electric power which is consumed by medium pressure UV lamp is converted to 20-25% UV light while rest of the energy is converted to IR radiation and part of the energy is emitted as visible light. With the use of the medium pressure of UV lamp the dual objectives of water disinfection and water softening is served since it emits wavelengths pertaining to UV as well as IR.

In accordance with the present invention, the apparatus contains additional inlets for injecting air/gas or steam bubbles, the inlets are positioned in proximity to the cavitator. Thus these inlets may be arranged on the non-cavitating side of the restriction and/or be arranged on the cavitating side of the restriction. When arranged on the cavitating side, the additional feed inlet may be arranged to get sucked in the reactor chamber due to the vacuum prevailing zone after the restriction. Externally injected air/gas and/or steam bubbles serve to introduce additional cavitation bubbles or nuclei in the upstream flow of the restriction or immediately at the downstream of the restriction. Thus by controlling rate of nucleation the total cavitation intensity (CV<1) can be controlled which is accomplished by controlling the amount of gas/steam bubbles introduced. Externally injected gas/steam bubbles may be selectively introduced into a selected number of holes of the multihole orifice plate. When a gas is introduced unevenly into few selective holes of the multi-hole orifice plate, trajectories of gaseous bubbles will be generated on the cavitating side of the orifice plate The location cluster where these paths of gaseous bubbles are maximized can be selectively irradiated with IR means. Gaseous bubbles produce different physicochemical effects compared to vaporous bubbles upon their collapse. Thus the intensity of IR irradiated for vaporous and gaseous bubbles will differ. Also $CO_2$ produced as a result of equilibrium reaction will be removed through its selective absorption by IR. Different intensities of IR irradiation are required for gaseous bubbles and water vaporous bubbles. With the aid of Computation Fluid Dynamics assisted phenomenological modelling, the simulations can pinpoint to the location cluster of selective trajectories of gaseous bubbles.

In accordance with the present invention, the apparatus contains IR light reflectors and/or peripherals of the light means such as electrodes, vibration-proof assembly, supporting system, wiper system, earthing arranged on the orifice plate without blocking the holes.

Various embodiments of the apparatus for carrying out the process of water descaling in accordance with the present invention are described as follows:

A first embodiment, FIG. (1) of the apparatus of present invention illustrates a hydrodynamic cavitation reactor (23) containing two multihole orifice plates (7) as a cavitator and IR sources (8). (2) and (2A) represent water inlet and outlet means of the reactor. Hard water enters the cavitation reactor through the inlet (2). A cavitation zone is created downstream of the orifice plates and is further irradiated with two IR sources (8) placed in the cavitating zone formed between two multihole orifice plates (7). The treated water exits the reactor through the outlet 2(A) for further processing.

A second embodiment, FIG. (2) of the apparatus of present invention illustrate a hydrodynamic cavitation reactor (23) containing two cavitation means such as a venturi (9) and a multihole orifice plate (10) and an IR source (11). (2) and (2A) represent water inlet and outlet of the reactor. Hard water enters the cavitation reactor through the inlet (2). Two cavitation zones are created, one between the venturi and the orifice plate, and another downstream of the orifice plate. The axial infra-red lamp (11) is arranged in the cavitating zone and passes through the orifice plate (10). A gasket connector (12) is arranged on the orifice plate (10) for housing the axial IR lamp (11). The cavitation zone causes effective precipitation of the soluble salts from the water. The treated water exits the reactor through the outlet 2(A) for further processing.

A third embodiment, FIG. (3) of the apparatus of present invention illustrates a hydrodynamic cavitation reactor (23) housing two separate water inlets (12), a water outlet (13) and an orifice plate (14) within each inlet. The cavitation is induced in two orifice plates through two different water inlets, the water flow from the two inlets is combined at the centre of the reactor housing, to improve the effect of the cavitation due to additional element of shear resulting from the mixing of the two different inlet streams. Radial IR lamps (15) are arranged downstream of each of the two orifice plates. The mixed zone where two inlets collide may be additionally irradiated with extra IR means which can be arranged perpendicular to the direction of mixing cluster.

A fourth embodiment, FIG. (4) of the apparatus of present invention illustrate a hydrodynamic cavitation reactor (23) with three multihole orifice plates (16) and an axial IR Lamp (17) arranged downstream of the cavitating side of the reactor. (2) and (2A) represent water inlet and outlet of the reactor. A gasket connector (18) is arranged on the two orifice plates (16) that house the axial IR lamp (17).

A fifth embodiment, FIG. (5) of the apparatus of present invention illustrates a hydrodynamic cavitation reactor containing a venturi (5) coupled to infrared radiation emitter (6) within the reactor. Gas/Steam sparger (3) is provided near the water inlet (2) of the reactor, to alter cavitation intensity. Additional gas/air inlet (4) is provided in the cavitation zone at the downstream of the venturi. By introducing cavitation gas bubbles externally in the upstream flow prior to venturi configuration (5), a well-defined and consistent pressure variation is provided in the flow for radial bubble motion. In such a configuration a good control over cavitation intensity is produced due to good control over rate of nucleation and nature of pressure variation driving the bubble motion. Moreover the total cavitation intensity in the reactor is controlled by controlling the amount of gas introduced through the sparger arranged in the upstream of the constriction. Water outlet (2A) of the reactor is further connected to filter assembly to remove precipitated salts.

A sixth embodiment, FIG. (6) of the apparatus of the present invention illustrates a multihole orifice plate (19) provided with a spiral array of IR LEDS (18). The geometry of the shape of the orifice hole is a variable and is not limited to star, a triangle, a circle, or a square etcetera.

A seventh embodiment, FIG. (7) of the apparatus of present invention illustrates a multihole orifice plate (21) provided with a radial array of IR LEDS (20). The two radial IR lamps help to create a uniform band of radiation for irradiating the cavitating bubbles. Herein one of the two radial IR lamps (IR lamp1) may be irradiated in a continuous mode whilst the other radial IR lamp (IR lamp2) may be irradiated in a pulsed mode of operation to further optimize the extent of IR dose. Also, whilst keeping IR lamp2 in the pulsed mode, IR lamp1 may be replaced with medium pressure UV lamp which simultaneously emits UV+IR. This may be desired when the multiple objectives of water disinfection, advanced oxidation and water descaling are desired.

An eighth embodiment, FIG. (8) of the apparatus of the present invention illustrates a hydrodynamic cavitation reactor (23) arranged in series with the IR reactors (24). In this embodiment, hard water from the reservoir (22) is first subjected to a hydrodynamic cavitation reactor, and then fed to a separate IR reactor. The two reactors can be configured to operate with either cavitation only recycle mode and/or with combined cavitation and IR treated recycle mode to lengthen the average residence time to cavitation and IR intensities to ultimately maximize the extent of salt precipitation in unit time. Treated water is then passed to a degassifier (25) to remove any residual gases and then fed to a downstream filter (26) to remove precipitated salts, collecting the de-scaled water in the reservoir (27).

In the hydrodynamic cavitation reactors of the above embodiments the equilibrium reaction of salt precipitation is disrupted not only by the cavitation alone but also by the dose of IR irradiation. This is because IR disrupts the equilibrium further by higher absorption of water towards IR ultimately raising the temperature of water and selective absorbance of dissolved $CO_2$ and produced $CO_2$ (which is produced as a result of equilibrium reaction) over $O_2$ and $N_2$ towards IR, which enhances the rate of removal of $CO_2$ release, a key factor to raising the pH, lowering conductivity, and precipitating salts.

It is postulated that when $CO_2$ produced through the prior hydrodynamic cavitation (HC) means (arranged in the direction of the inlet stream) absorbs IR irradiated through the IR means (such as array of IR LEDs or IR lamps), which are arranged downstream of the HC means, then IR causes bonds of $CO_2$ molecule to bend and vibrate which then in turn allows $CO_2$ molecule to gain kinetic energy which further accelerates the release rate of $CO_2$. Water will also absorb IR and the temperature will be raised, a factor, which will again shifts the equilibrium more towards the $CaCO_3$ precipitation.

IR radiation dose in the reactor chamber can be raised by raising the IR power of each LEDs (each may up to 300-700 W) and/or by using high power Mercury IR lamps (up to 1-2 KW) and/or by having more residence time by the design variation(s) and/or by using IR reflectors inside the reactor. It is seen that at wavelength of 1450 nm, absorption coefficient of water towards IR is the maximum. For $CO_2$ absorption spectrum, there are 3 main $CO_2$ bands of IR absorption at wavelengths 1388, 667, 2349 cm−1. IR LEDs emitting range of mono wavelengths at which the absorption of $CO_2$ and water towards IR is maximum may be selected. It is also possible to select a singular monowavelength of IR which shows highest absorbance not only towards $CO_2$ absorption but also towards water absorption. Other selection criterion may vary wherein IR LEDs of multiple mono wavelengths, each specific to maximum $CO_2$ absorption and maximum water absorption can be selected and are mixed in an IR LED array not only based on the wavelength mix and but also on the basis of number of IR LEDs. In such case a metric of weightage average for each of the mono wavelength of IR LEDs may be used to relatively quantify the mix of different mono-wavelengths.

Another aspect of the present invention comprises a water descaling apparatus which includes a combination of hydrodynamic cavitation, infra-red radiation and acoustic cavitation. Having acoustic cavitation (ultrasound) arranged in HC+IR reactor will offer a flexibility to create cavitation events with higher cavitation intensity (higher magnitudes of temperature and pressure released upon the collapse of a bubble) than that of HC assisted cavitation. Acoustic cavitation will be useful in creating cavitation events in the dead zones of the reactor arranged with HC means, thus helps in creating uniform cavitation events in the bulk of the water medium.

In still another aspect of the present invention there is provided a hydrodynamic cavitation water descaling system which includes a combination of hydrodynamic cavitation, infra-red and magnetic field. Water is dipolar weak magnet with hydrogen molecule at positive end and oxygen at negative end. Under the influence of magnetic field, diamagnetic water will repel magnet and salt mobility will be enhanced. Salt precipitation is a two-step process. The first step includes nucleation step and the second step includes crystal growth. Hydrodynamic cavitation provides the increased nucleation sites in the form of small sized $CaCO_3$ colloids. Having magnetic effect in combination with HC and IR will promote the crystal growth leading to efficient salt precipitation.

The apparatus of the present invention may have various features as follows:

a. Singular/multiple inlet(s) and singular/multiple outlet(s). Externally injected air/gas and/or steam bubbles in the upstream and/or in the downstream flow of the cavitating restriction.

b. Reactor may have a reflector coating that reflects IR. If UV lamp is used in combination with the IR lamp then two separate reflector coatings towards selective reflection of UV and IR may be used. Shape of IR lamp can be a variable such as circular array of IR LEDs, an axial IR lamp (single or double ended), spiral shaped lamp.

c. IR lamp source may be at least partially submerged in the water medium.

d. IR source may emit radiation in continuous and/or pulsed mode. If deployed in pulsed mode, IR radiation can be effectively synched in with the cavitation frequency, to maximize/optimize descaling objective. Number of pulsed IR lamps can be arranged in such a way that they are pulsing at non-overlapping time intervals across a given cross section so that the collapsing bubble cavities can be effectively targeted to maximize the physicochemical effects upon the collapse of the bubbles.

e. The position of IR lamp(s), which are arranged downstream to the HC means, varies with the cluster of air bubbles and with the cluster where $CO_2$ is readily released from the equilibrium reaction affected by the cavitator.

f. The HC reactor may contain rotating cavitators in combination with IR means.

g. Acoustic means producing an ultrasound wave for causing a secondary cavitation may be used in the upstream and/or in the downstream of the hydrodynamic cavitator along the direction of the flow.

h. The IR light means may be preferably arranged adjacent to the orifice plate on the cavitation side, in case of at least one orifice plate. The IR light means may be arranged outside of the plurality of holes, in such a way that the light means do not block the holes. The IR light means could be arranged at the outer boundary of the orifice plate, or in between the plurality of holes. Alternatively the IR light means could also be individually arranged for each of the individual hole on the orifice plate.

i. IR light reflectors and/or peripherals of the light means such as electrodes, vibration-proof assembly, supporting system, wiper system, earthing may be arranged on the orifice plate without blocking the holes.

j. The process in accordance with the present invention may be deployed in a medium similar to mediums such as water, grey water, sea water, radioactively-toxic water or any other such medium requiring dissolved salt to be removed by precipitation.

k. The process/system in accordance with the present invention may be used for selective $CO_2$ de-gassing from water related medium where $CO_2$ is in the dissolved state.

l. IR LEDs of multiple mono wavelengths, each specific to maximum $CO_2$ absorption and maximum water absorption can be selected and mixed in an IR LED array.

m. Reactor may have a vibrational proof assembly.

n. Inline pH, conductivity measurement, $CO_2$ concentration may be monitored to quantify the extent of precipitation.

o. Filter/Cyclone separator may be attached in the downstream to remove precipitated salt.

p. Cavitation intensity (value of Cv), IR Dose, Magnetic Field intensity may be varied to maximise the salt precipitation.

Technical Advantage

For hydrodynamic cavitation reactors, the extent of salt precipitation is directly proportional to the pressure drop across the restriction. Higher the pressure drop better is the salt removal efficiency. Compared to only HC based salt precipitation, combination of hydrodynamic cavitation reactor with infra-red achieves salt precipitation with reduced pressure drop and with reduced number of recirculation loops. This is accomplished due to enhanced disruption of equilibrium reaction towards the salt precipitation, so the effective salt precipitation is achieved with lower pressure drop resulting in higher savings due to reduced energy costs. Single pass salt precipitation is also maximised due to use of IR in combination with HC.

The system/process in accordance with the present invention may find commercial applications in the following markets, 1. Cooling tower descaling,
2. Grey Water descaling,
3. Ground water descaling,
4. An upfront retrofit to reverse osmosis based desalination plants to reduce the load of salts subjected to reverse osmosis membrane units.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

Any discussion of documents, acts, materials, devices, articles or the like that has been included in this specification is solely for the purpose of providing a context for the invention. It is not to be taken as an admission that any or all of these matters form part of the prior art base or were common general knowledge in the field relevant to the invention as it existed anywhere before the priority date of this application.

While considerable emphasis has been placed herein on the specific steps of the preferred process, it will be appreciated that many steps can be made and that many changes can be made in the preferred steps without departing from the principles of the invention. These and other changes in the preferred steps of the invention will be apparent to those skilled in the art from the invention herein, whereby it is to be distinctly understood that the foregoing descriptive matter is to be interpreted merely as illustrative of the invention and not as a limitation.

The invention claimed is:

1. An apparatus for water descaling, said apparatus comprising:
    at least one inlet for introducing hard water stream containing soluble salts in the apparatus;
    a hydrodynamic cavitation reactor communicating with said at least one inlet, said cavitation reactor comprising a cavitator, said cavitator having a configuration capable of disrupting equilibrium reaction of the soluble salts in the hard water stream;
    at least one infrared radiation emitter configured to produce infrared radiation, said emitter placed in a location selected from the group consisting of inside the cavitation reactor and outside the cavitation reactor, said infrared radiation being configured to disrupt the equilibrium reaction of the soluble salts in the hard water stream by absorption of water towards the infrared radiation and selective absorbance of carbon dioxide ($CO_2$) that is dissolved, produced or dissolved and produced in the hard water stream; and
    a filter assembly fitted downstream of the emitter.

2. The apparatus as claimed in claim 1, wherein the infrared radiation emitter is located inside the cavitation reactor downstream of a cavitating side of the cavitator, and wherein the cavitator is at least one selected from the group consisting of an orifice plate, venturi and a rotating cavitator.

3. The apparatus as claimed in claim 1, wherein the cavitator is at least one venturi configured within the cavitation reactor.

4. The apparatus as claimed in claim 1, wherein the cavitator is at least one orifice plate.

5. The apparatus as claimed in claim 4, wherein the orifice plate is a multihole orifice plate.

6. The apparatus as claimed in claim 1, wherein the cavitator is a combination of at least one venturi configured within the cavitation reactor and at least one multihole orifice plate arranged in series with the configured venturi.

7. The apparatus as claimed in claim 1, wherein the emitter is a medium pressure ultraviolet lamp emitting ultra violet and infrared radiations.

8. The apparatus as claimed in claim 1, wherein the emitter is at least one selected from the group consisting of a spiral array of IR light emitting diodes (LEDs), radial array of IR LEDs and axial array of IR LEDs.

9. The apparatus as claimed in any one of claim 5 or 6, wherein the emitter is an array of IR LEDs is arranged on a cavitating side of the multihole orifice plate.

10. The apparatus as claimed in any one of claims 1 to 6, 7 and 8, wherein the emitter is placed between consecutive multihole orifice plates.

11. The apparatus as claimed in claim 1, wherein the emitter is IR LEDs of multiple mono wavelengths, each specific to maximum $CO_2$ absorption and maximum water absorption.

12. The apparatus as claimed in claim 1, wherein the cavitation reactor has at least one reflector coating to reflect infrared radiation from the emitter.

13. The apparatus as claimed in claim 12, wherein the reflector coating is a vacuum deposition of a metal selected from the group consisting of gold, aluminium and silver.

14. The apparatus as claimed in claim 1, wherein the cavitation reactor further comprises at least one gas or steam inlet, for injecting air or gas or steam bubbles in the cavitation reactor for varying the intensity of cavitation.

15. The apparatus as claimed in claim 1, wherein the apparatus further includes a degassifier placed between emitter and the filter assembly.

16. A process for descaling hard water containing soluble salts, said process comprising passing hard water containing soluble salts through the apparatus of claim 1.

17. The apparatus as claimed in claim 2, wherein a portion of the emitter extends into the cavitation reactor downstream of the cavitating side of the cavitator so that a flow of the hard water stream exiting the cavitating side of the cavitator flows around at least one side and at least one free end of the emitter.

18. The apparatus as claimed in claim 2, wherein the cavitator is at least one multihole orifice plate, and wherein the emitter extends from the cavitating side of the multihole orifice plate, the emitter being a spiral strip of IR LEDs or a plurality of concentrically arranged circular strips of IR LEDs.

* * * * *